(12) United States Patent
Al-Mutairi

(10) Patent No.: US 8,590,204 B1
(45) Date of Patent: *Nov. 26, 2013

(54) FISHING ROD WITH CASTING MECHANISM

(71) Applicant: Mohammed M. Kh. Kh. Al-Mutairi, Fahaheel (KW)

(72) Inventor: Mohammed M. Kh. Kh. Al-Mutairi, Fahaheel (KW)

(*) Notice: Subject to any disclaimer, the term of this patent is extended or adjusted under 35 U.S.C. 154(b) by 0 days.

This patent is subject to a terminal disclaimer.

(21) Appl. No.: 13/898,434

(22) Filed: May 20, 2013

(51) Int. Cl.
*A01K 91/02* (2006.01)
(52) U.S. Cl.
USPC .................................................. 43/19
(58) Field of Classification Search
USPC .......................................... 43/19; 124/26, 27
See application file for complete search history.

(56) References Cited

U.S. PATENT DOCUMENTS

| | | | | |
|---|---|---|---|---|
| 1,434,768 A * | 11/1922 | Boggess | ............................ | 43/19 |
| 3,001,316 A * | 9/1961 | Fefelov | ............................ | 43/19 |
| 3,266,184 A | 8/1966 | Brown | | |
| 3,400,480 A | 9/1968 | Worsham | | |
| 3,416,256 A | 12/1968 | Blocker | | |
| 3,717,947 A * | 2/1973 | Nomura | ............................. | 43/19 |
| 3,962,813 A | 6/1976 | Moon | | |
| 4,845,879 A * | 7/1989 | Urso | ........................... | 43/18.1 R |
| 4,845,880 A | 7/1989 | Miller | | |
| 5,491,924 A * | 2/1996 | Athanasiadis | ..................... | 43/19 |
| 5,735,074 A * | 4/1998 | Stauffer | ............................. | 43/19 |
| 5,926,991 A | 7/1999 | Chesnut | | |
| 6,880,286 B2 * | 4/2005 | Wyman et al. | ..................... | 43/19 |
| 7,409,794 B2 * | 8/2008 | Triano et al. | ...................... | 43/19 |
| 7,698,851 B1 | 4/2010 | Donohoe | | |
| 7,712,244 B2 * | 5/2010 | Mamae | ............................... | 43/19 |
| 8,276,309 B2 * | 10/2012 | Al-Mutairi | ........................ | 43/19 |
| 2011/0005120 A1 | 1/2011 | De Koning et al. | | |

* cited by examiner

*Primary Examiner* — Christopher P Ellis
(74) *Attorney, Agent, or Firm* — Richard C Litman

(57) ABSTRACT

The fishing rod with casting mechanism enables an angler to cast a lure or the like by cocking or arming the mechanism and pressing the release. The device includes a central stock having a lower brace and upper tubular member spaced apart from the lower brace, with forward and rearward plates connecting the brace and tube. A spinning reel is installed between the lower brace and upper tube. A coil compression spring and a plurality of elastic tensile members in tandem therewith is installed in the upper tubular member. A telescoping rod extends from the forward plate, and a handle extends from the rear plate. The mechanism propels a projectile (lure, sinker, float, etc.) and tackle (hook, lure, etc.) when the compressed spring and extended elastic bands are released. The projectile draws the fishing line from the reel. The projectile and tackle are reeled in conventionally after the cast.

20 Claims, 3 Drawing Sheets

FISHING ROD WITH CASTING MECHANISM

BACKGROUND OF THE INVENTION

1. Field of the Invention

The present invention relates generally to fishing equipment, and particularly to a fishing rod with casting mechanism powered by a spring and elastic band.

2. Description of the Related Art

Recreational fishing using a rod and reel is as much an art as it is a science. Many aspects of handling a rod and reel require a great deal of skill. Among these aspects is casting a lure or the like at the end of the fishing line to a relatively remote location from the angler and his or her fishing rod. While the general technique is not particularly difficult to learn, the ability to place the lure consistently with great precision requires considerable practice, and many anglers are never able to achieve the precision desired.

Aside from the considerable skill required, there are those who are physically handicapped and who simply cannot move their arm to the extent required to make a good cast. Yet rod and reel fishing is an activity that appeals universally to a great number of people, both young and old, many of whom may be unable to perform this aspect of angling. Even those who are able-bodied may find themselves unable to cast a lure or bait to the distance desired, under certain circumstances.

Thus, a fishing rod with casting mechanism solving the aforementioned problems is desired.

SUMMARY OF THE INVENTION

The fishing rod with casting mechanism is similar to the fishing rod with a casting mechanism disclosed in U.S. Pat. No. 8,276,309 issued on Oct. 2, 2012 to the present inventor, which is hereby incorporated by reference in its entirety. The fishing rod includes a stock or body portion having a longitudinal lower brace and a longitudinal upper tubular member, and forward and rearward plates connect the lower and upper members to one another. A telescoping fishing rod extends from the forward plate, and a handle extends from the rearward plate. A spinning reel having its rotational axis aligned parallel to the fishing rod is installed in the area defined by the upper and lower members and the forward and rearward plates.

A coil compression spring is installed in the upper tubular member, abutting the rear plate. A cocking arm extends through the rear plate and the spring to a disc at the forward end of the spring. A plurality of elastic bands are attached to the disc, and extend forward to attach to the inner wall of a passage through the front plate. The forward end of the cocking arm extends through the disc and serves as a seat for a projectile (sinker, float, etc.). The projectile, in turn, is attached to an extension line from the conventional hook extending from the fishing line at the end of the rod. Drawing the cocking arm rearward compresses the spring and simultaneously extends the elastic bands to arm the casting mechanism. A latch mechanism is provided at the juncture of the rear plate and upper tube to hold the spring in its compressed state and the elastic bands in their extended states. Release of the latch mechanism allows the spring to extend and the bands to retract, thus propelling the disc forward until it reaches the forward plate. The projectile is propelled through the passage in the forward plate, drawing with it the end of the fishing line to which it is attached and drawing the fishing line from the reel. The projectile and other fishing tackle (line, hook, lure, etc.) to which it is attached are then reeled back in, using the conventional rewind mechanism of the reel.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fishing rod with casting mechanism according to the present invention uses both a compressive coil spring and a plurality of extensible bands (e.g., rubber or elastic bands, springs, etc.) as the propulsive means to discharge or propel a ballistic mass or projectile to cast the line and tackle (fishing hook and leader, lure, bait, etc.) to the desired location. The reel used with the fishing rod is a spinning reel, i.e., and the rotary axis of the reel is substantially aligned with the longitudinal axis of the fishing rod. Other features are described in detail further below.

Figure 1:
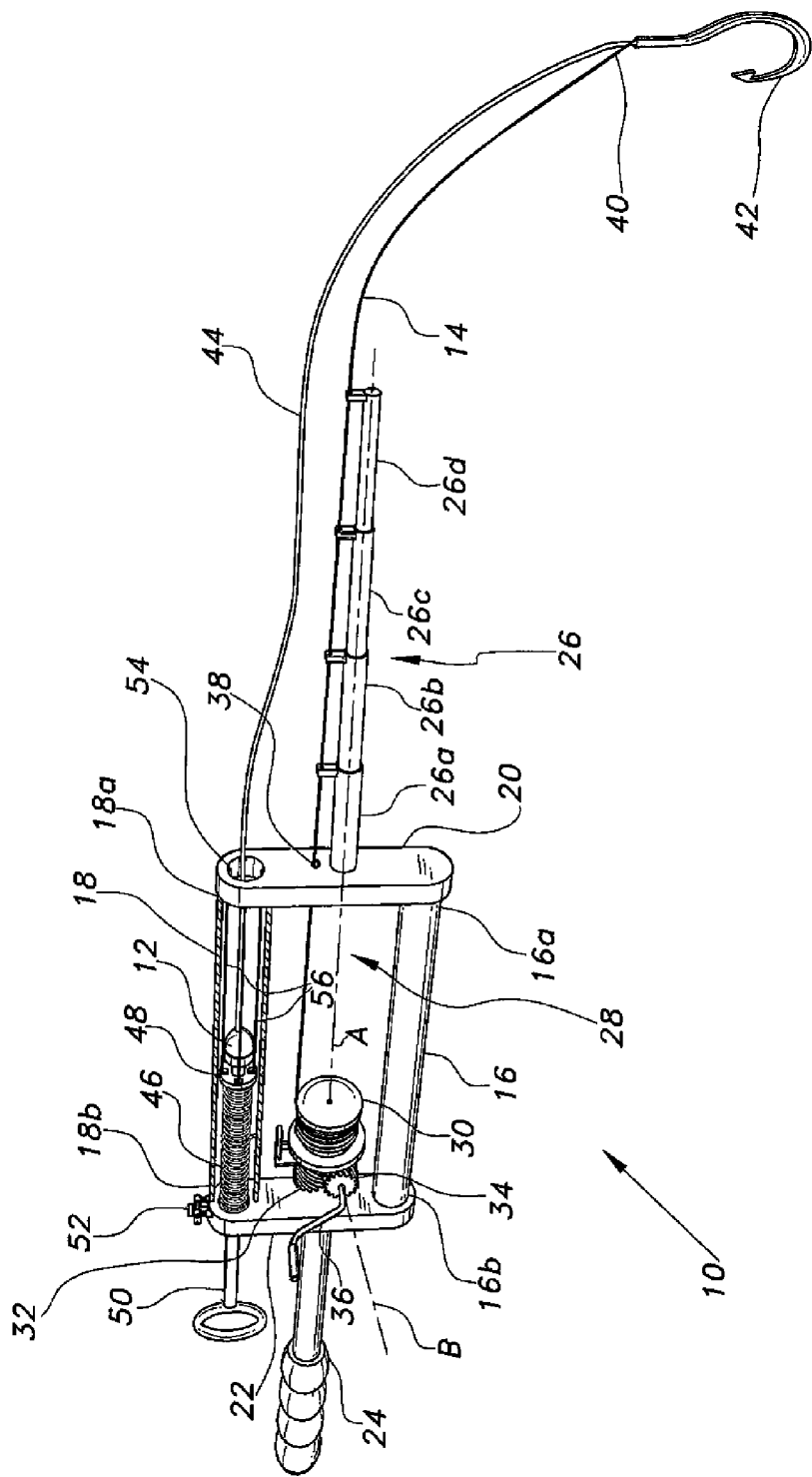
FIG. 1 is a right side perspective view of a fishing rod with casting mechanism according to the present invention, showing the device ready for casting, the casting mechanism being broken away and partially in section.

FIG. 1 of the drawings provides a perspective view of the fishing rod with casting mechanism (or simply fishing rod) 10, shown with the fishing rod 10 of FIG. 1 cocked or armed and ready to launch the projectile 12 to draw or cast the fishing line 14. The fishing rod 10 comprises a lower brace 16 and a substantially parallel upper tubular member 18, the tubular member 18 being shown in section in FIGS. 1 and 2 in order to illustrate internal components. The forward ends 16a and 18a of the lower brace 16 and upper tubular member 18 are rigidly attached to a forward plate 20, while the rearward ends 16b and 18b of the lower brace 16 and upper tubular member 18 are rigidly attached to a rearward plate 22. A handle 24 extends rearward from the rear plate 22, and a rod 26 having telescoping segments 26a through 26d extends from the forward plate 20.

The lower brace 16, upper tubular member 18, forward plate 20, and rearward plate 22 collectively define a reel installation area 28 therein. A fishing reel 30 is installed in the area 28. The reel 30 preferably is a spinning-type reel having its rotary axis aligned substantially longitudinally with the fishing rod 10. More preferably, the rotary axis of the fishing reel 30 and the longitudinal axis of the rod 26 are aligned concentrically with one another along a common longitudinal axis A. A first helical gear 32 is installed upon a portion of the rotary reel shaft that extends rearward from the reel 30, and a second helical gear 34 meshes with the first helical gear 32. A crank handle 36 extends from the second helical gear 34. The crank handle 36 has a rotational axis B generally normal to the longitudinal axis of the rod 26 and the rotary axis of the reel 30. It will be seen that the open reel and helical gears 32 and 34 may be enclosed in a housing, if desired, as in the case of many spinning-type reels.

The fishing line 14 extends from the reel 30 forward beneath the upper tubular member 18 to pass through a line passage 38 formed through the forward plate 20, and through a series of conventional guides or eyes installed atop the rod 26. The distal end 40 of the line 14 is connected to conventional fishing tackle 42, e.g., a hook, or a lure, bait, etc., as desired. A connecting line 44 extends from the projectile 12 to connect to the fishing tackle or hook 42 at the distal end 40 of the fishing line 14. This connecting line 44 is drawn by the projectile 12 as it travels along its ballistic path after launch to draw the attached fishing tackle 42 and the fishing line 14 from the reel 30.

Figure 2:
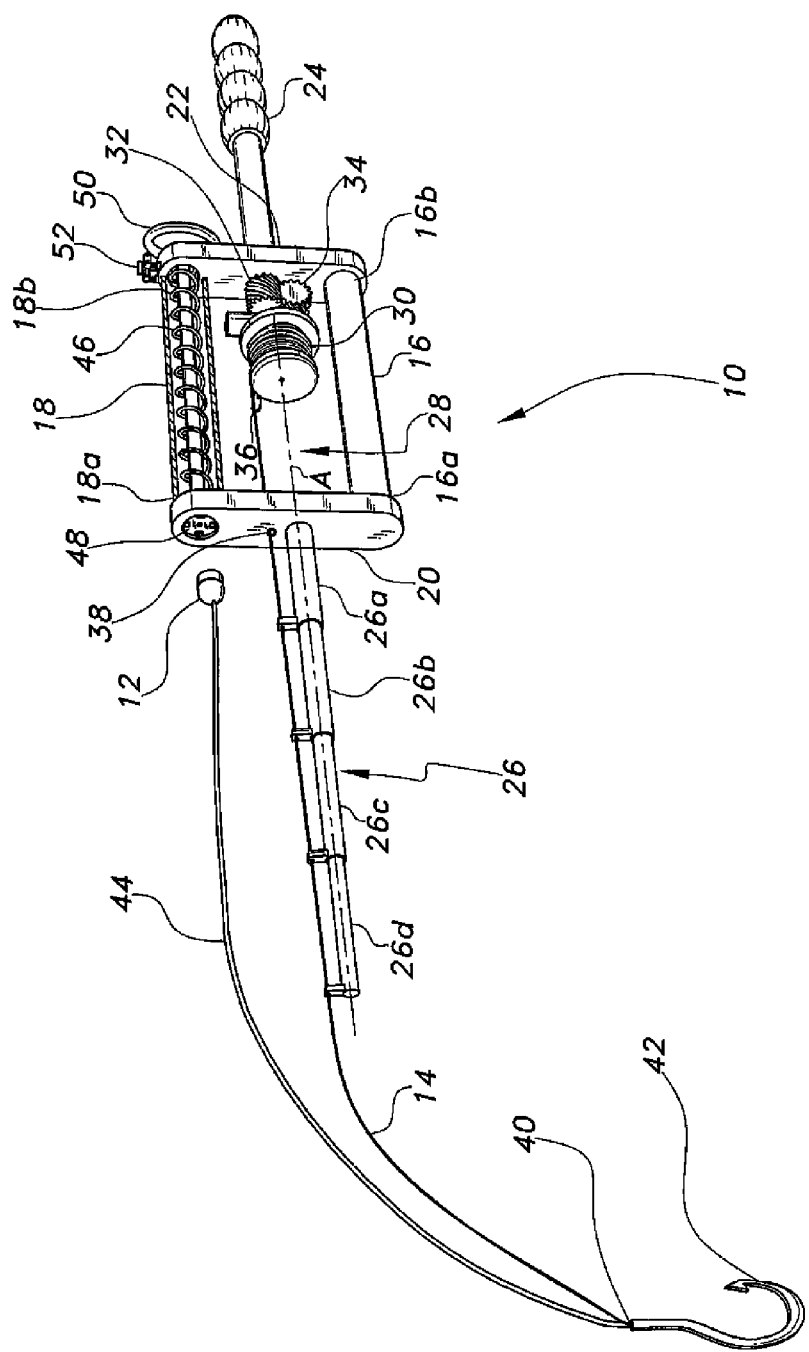
FIG. 2 is a left side perspective view of the fishing rod with casting mechanism according to the present invention, showing the device as the cast has been initiated, the casting mechanism being broken away and partially in section.
Figure 3:
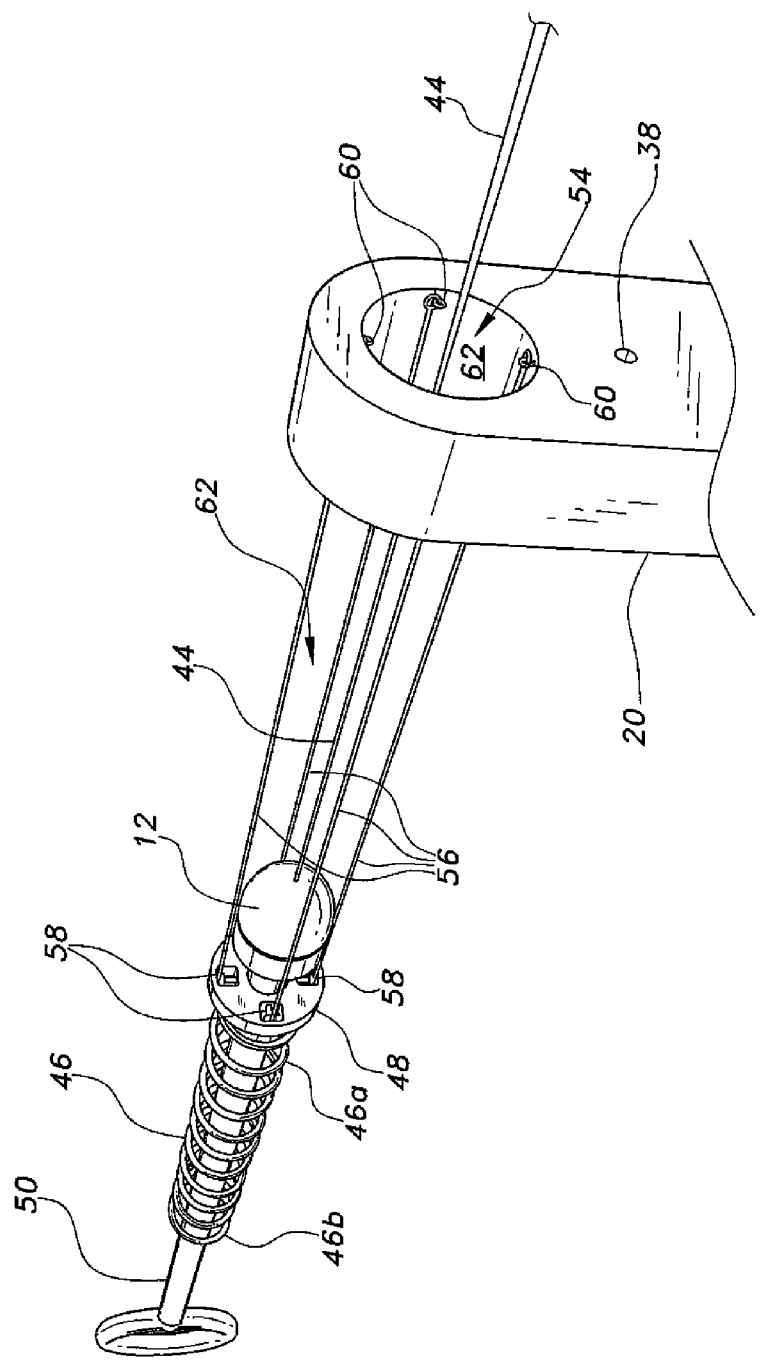
FIG. 3 is a detailed perspective view of the spring and elastic band actuator mechanism of the fishing rod with casting mechanism according to the present invention, illustrating various details thereof.

The casting mechanism is most clearly illustrated in the detailed view of FIG. 3. Most of the other components (e.g., the upper tubular member 18, etc.) are not shown in FIG. 3 for clarity in the drawing. A selectively compressible coil spring 46, i.e., a compression spring, is installed concentrically within the upper tubular member 18 as shown in FIGS. 1 and 2, and a disc 48 is disposed across the forward end 46a of the spring. The opposite rearward end 46b of the spring seats against the upper forward surface of the rear plate 22, as shown in FIGS. 1 and 2. The forward end of a cocking handle 50 is attached conventionally to the disc 48, e.g., by mating threads in a central receptacle in the disc 48, or other means as desired. The cocking handle 50 comprises an elongate shaft extending rearward from the disc 48, concentrically through the spring 46, and then through a passage through the rear plate 22. The forward end of the cocking handle 50 extends through the disc 48. The projectile 12 has a receptacle therein in which the forward extension of the cocking handle 50 seats when the projectile 12 is installed in the fishing rod 10.

Drawing the cocking handle 50 rearward compresses the spring 46 between the disc 48 and the forward face of the rear plate 22, storing energy to cast the projectile 12 when the spring 46 is released. A selectively operable release mechanism 52 is installed at the rearward end 18b of the upper tubular member and the top of the rearward plate 22, as shown in FIGS. 1 and 2. Details of the release mechanism are described in the aforementioned U.S. Pat. No. 8,276,309 to the present inventor, incorporated by reference herein as noted further above. The release mechanism 52 catches the upper edge of the disc 48 when latched, to hold the spring 46 in a compressed state. When the release mechanism 52 is unlatched, the disc 48 and spring 46 are released to cast the projectile 12 through the upper tubular member 18 and out the passage 54 formed through the forward plate 20 concentrically with the tubular member 18, thereby drawing the fishing line 14 from the reel 30 by means of the connecting line 44.

Additional propulsive force is provided by a plurality of selectively extensible elastic bands 56 that extend forward from the disc 48 to the forward plate 20. The disc 48 includes a plurality of generally peripherally disposed elastic band attachments 58 therearound, as shown in FIG. 3, such as the openings distributed around the outer portion of the disc 48, each of the openings having a retaining pin extending thereacross. The rearward ends of the elastic bands 56 are secured in the band attachments 58 of the disc 48 by means of these retaining pins. The opposite forward ends of the elastic bands 56 are secured to corresponding attachments 60 (e.g., eyelets, etc.) that are, in turn, anchored in the inner wall 62 of the projectile passage 54 through the forward plate 20.

The peripheral attachment of the rearward ends of the elastic bands 56 to the disc 48 and the attachment of the forward ends of the bands 56 to the wall 62 of the projectile passage 54 through the forward plate 20 result in the bands 56 defining a generally cylindrical projectile clearance passage 64 therebetween, particularly as the bands 56 are extended. It will be seen that drawing the cocking handle 50 rearward not only compresses the spring 46, but also places the elastic bands 56 in tension to impart additional propulsive force to the projectile 12 when it is released. Thus, both the compressive force of the spring 46 and the tensile forces of the elastic bands 56 are applied to propel the projectile 12 during a cast.

As the projectile 12 is attached to the connecting line 44 and the connecting line 44 is attached to the distal end 40 of the fishing line 14, the fishing line 14 is drawn from the reel 30 as the projectile 12 travels its ballistic path during a cast. After the cast is completed, the fishing line 14 and its tackle 42, the attached connecting line 44, and the projectile 12 attached to the connecting line 44 may be retrieved by winding the fishing line 14 onto the reel 30 in the conventional manner. The projectile 12 is once again seated on the protruding forward end of the cocking handle 50 and the cocking handle is drawn rearward until the release mechanism 52 captures the edge of the disc 48, thereby readying the fishing rod 10 for another cast.

It is to be understood that the present invention is not limited to the embodiments described above, but encompasses any and all embodiments within the scope of the following claims.

I claim:

1. A fishing rod, comprising:
   a lower brace having a forward end and a rearward end;
   an upper tubular member disposed above and spaced apart from the lower brace, the upper tubular member having a forward end and a rearward end;
   a forward plate connecting the forward ends of the lower brace and the upper tubular member to one another, the forward plate having a passage therethrough concentric with the upper tubular member, the passage having an inner wall;
   a rearward plate connecting the rearward ends of the lower brace and the upper tubular member to one another, the lower brace, the upper tubular member, the forward plate, and the rearward plate defining a reel installation area therein;
   a handle extending from the rearward plate;
   a rod extending from the forward plate, the rod having a longitudinal axis;
   a reel disposed within the reel installation area;
   a fishing line extending from the reel and along the rod, the fishing line having a distal end;
   fishing tackle attached to the distal end of the fishing line;
   a selectively compressible spring disposed concentrically within the upper tubular member, the spring having a rearward end abutting the rearward plate and a forward end opposite the rearward end;
   a disc disposed across the forward end of the spring, the disc having a plurality of elastic band anchors disposed thereon;
   a plurality of selectively extensible elastic bands extending from the disc to the inner wall of the passage of the forward plate;
   a projectile removably disposed forward of the disc; and
   a connecting line extending from the projectile to the fishing tackle at the distal end of the fishing line;
   wherein releasing the compressed spring and the extended elastic bands casts the projectile through the passage of the forward plate, the connecting line drawing the fishing line from the reel.

2. The automatic fishing rod according to claim 1, wherein:
   the reel has a rotational axis substantially concentric with the longitudinal axis of the rod; and
   the fishing line extends exteriorly along the rod.

3. The automatic fishing rod according to claim 1, wherein:
   the elastic band anchors of the disc are disposed generally peripherally; and
   the elastic bands define a projectile clearance passage therebetween;
   wherein releasing the compressed spring and the extended elastic bands casts the projectile through the projectile clearance passage of the elastic bands and the passage of the forward plate.

4. The automatic fishing rod according to claim 1, further comprising:
   a first helical gear extending rearward from the reel and external to the reel;
   a second helical gear meshing with the first helical gear; and
   a crank handle extending from the second helical gear, the crank handle having a rotational axis normal to the rotational axis of the shaft of the reel.

5. The automatic fishing rod according to claim 1, further comprising a selectively operable release mechanism disposed upon the rearward end of the upper tubular member and the rearward plate.

6. The automatic fishing rod according to claim 1, further comprising an elongate cocking handle extending from the disc, through the spring, and through the rearward plate.

7. The automatic fishing rod according to claim 1, wherein the rod is selectively telescoping.

8. A fishing rod with casting mechanism, comprising:
   a lower brace having a forward end and a rearward end;
   an upper tubular member disposed above and spaced apart from the lower brace, the upper tubular member having a forward end and a rearward end;
   a forward plate connecting the forward ends of the lower brace and the upper tubular member to one another, the forward plate having a passage therethrough concentric with the upper tubular member, the passage having an inner wall;
   a rearward plate connecting the rearward ends of the lower brace and the upper tubular member to one another, the lower brace, the upper tubular member, the forward plate, and the rearward plate defining a reel installation area therein;
   a handle extending from the rearward plate;
   a rod extending from the forward plate, the rod having a longitudinal axis;
   a reel disposed within the reel installation area, the reel having a rotational axis substantially concentric with the longitudinal axis of the rod;
   a fishing line extending from the reel and exteriorly along the rod, the fishing line having a distal end;
   fishing tackle attached to the distal end of the fishing line;
   a selectively compressible coil spring disposed concentrically within the upper tubular member, the spring having a rearward end abutting the rearward plate and a forward end opposite the rearward end;
   a projectile removably disposed forwardly of the forward end of the spring; and
   a connecting line extending from the projectile to the fishing tackle at the distal end of the fishing line;
   wherein releasing the compressed spring casts the projectile through the passage of the forward plate, the connecting line drawing the fishing line from the reel.

9. The automatic fishing rod according to claim 8, further comprising:
   a disc disposed across the forward end of the spring, the disc having a plurality of elastic band anchors thereon; and
   a plurality of selectively extensible elastic bands extending from the disc to the inner wall of the passage of the forward plate;
   wherein releasing the compressed spring and the extended elastic bands casts the projectile through the passage of the forward plate.

10. The automatic fishing rod according to claim 9, wherein:
    the elastic band anchors of the disc are disposed generally peripherally; and
    the elastic bands define a projectile clearance passage therebetween;
    wherein releasing the compressed spring and the extended elastic bands casts the projectile through the projectile clearance passage of the elastic bands and the passage of the forward plate.

11. The automatic fishing rod according to claim 8, further comprising:
    a first helical gear extending rearwardly from the reel, externally to the reel;
    a second helical gear meshing with the first helical gear; and
    a crank handle extending from the second helical gear, the crank handle having a rotational axis normal to the rotational axis of the shaft of the reel.

12. The automatic fishing rod according to claim 8, further comprising a selectively operable release mechanism disposed upon the rearward end of the upper tubular member and the rearward plate.

13. The automatic fishing rod according to claim 8, further comprising:
    a disc disposed across the forward end of the spring; and
    an elongate cocking handle extending from the disc, through the spring, and through the rearward plate.

14. The automatic fishing rod according to claim 8, wherein the rod is selectively telescoping.

15. A fishing rod with casting mechanism, comprising:
    a lower brace having a forward end and a rearward end;
    an upper tubular member disposed above and spaced apart from the lower brace, the upper tubular member having a forward end and a rearward end;
    a forward plate connecting the forward ends of the lower brace and the upper tubular member to one another, the forward plate having a passage therethrough concentric with the upper tubular member, the passage having an inner wall;
    a rearward plate connecting the rearward ends of the lower brace and the upper tubular member to one another, the lower brace, the upper tubular member, the forward plate, and the rearward plate defining a reel installation area therein;
    a handle extending from the rearward plate;
    a rod extending from the forward plate, the rod having a longitudinal axis;
    a reel disposed within the reel installation area;
    a fishing line extending from the reel and along the rod, the fishing line having a distal end;
    fishing tackle attached to the distal end of the fishing line;
    a selectively compressible coil spring disposed concentrically within the upper tubular member, the spring having a rearward end abutting the rearward plate and a forward end opposite the rearward end;
    a disc disposed across the forward end of the spring, the disc having a plurality of elastic band anchors disposed generally peripherally;
    a plurality of selectively extensible elastic bands extending from the elastic band attachments of the disc to the inner wall of the passage of the forward plate, the elastic bands defining a projectile clearance passage therebetween;

a projectile removably disposed forwardly of the disc; and a connecting line extending from the projectile to the fishing tackle at the distal end of the fishing line;

wherein releasing the compressed spring and the extended elastic bands casts the projectile through the projectile clearance passage of the elastic bands and the passage of the forward plate, the connecting line drawing the fishing line from the reel.

16. The automatic fishing rod according to claim 15, wherein:

the reel has a rotational axis substantially concentric with the longitudinal axis of the rod; and the fishing line extends exteriorly along the rod.

17. The automatic fishing rod according to claim 15, further comprising:

a first helical gear extending rearward from the reel, external to the reel;

a second helical gear meshing with the first helical gear; and a crank handle extending from the second helical gear, the crank handle having a rotational axis normal to the rotational axis of the shaft of the reel.

18. The automatic fishing rod according to claim 15, further comprising a selectively operable release mechanism disposed upon the rearward end of the upper tubular member and the rearward plate.

19. The automatic fishing rod according to claim 15, further comprising an elongate cocking handle extending from the disc, through the spring, and through the rearward plate.

20. The automatic fishing rod according to claim 15, wherein the rod is selectively telescoping.

* * * * *